United States Patent
Baron et al.

(10) Patent No.: US 11,476,540 B2
(45) Date of Patent: Oct. 18, 2022

(54) MICROSTRUCTURES AND METHODS OF MAKING AND USING THEREOF

(71) Applicant: Dynami Battery Corp., Washington, DC (US)

(72) Inventors: Sergio Daniel Baron, Buenos Aires (AR); Daiana Elizabeth Medone Acosta, Buenos Aires (AR)

(73) Assignee: DYNAMI BATTERY CORP., Washington, DC (US)

( * ) Notice: Subject to any disclaimer, the term of this patent is extended or adjusted under 35 U.S.C. 154(b) by 0 days.

(21) Appl. No.: 17/591,878

(22) Filed: Feb. 3, 2022

(65) Prior Publication Data

US 2022/0247033 A1 Aug. 4, 2022

Related U.S. Application Data

(60) Provisional application No. 63/199,950, filed on Feb. 4, 2021.

(51) Int. Cl.
*H01M 50/403* (2021.01)
*H01M 4/13* (2010.01)
*H01M 50/411* (2021.01)
*H01M 10/0525* (2010.01)

(52) U.S. Cl.
CPC ........... *H01M 50/403* (2021.01); *H01M 4/13* (2013.01); *H01M 10/0525* (2013.01); *H01M 50/411* (2021.01)

(58) Field of Classification Search
CPC ..................................................... H01M 4/13
See application file for complete search history.

(56) References Cited

U.S. PATENT DOCUMENTS

| 5,868,939 A | 2/1999 | Oder et al. |
| 7,691,280 B2 * | 4/2010 | Waldrop ............. H05K 3/067 216/87 |

(Continued)

FOREIGN PATENT DOCUMENTS

| JP | 2019164993 | * | 9/2019 | ........ H01M 10/0525 |
| JP | 2019164993 A | * | 9/2019 | ........ H01M 10/0525 |
| WO | 2003012908 A2 | | 2/2003 | |

OTHER PUBLICATIONS

Mistier, R. E. and Twiname, E. R., "Tape casting theory and practice," The American Ceramic Society (2000), Westerville, OH, 309 pages.

(Continued)

*Primary Examiner* — Ula C Ruddock
*Assistant Examiner* — Thomas H. Parsons
(74) *Attorney, Agent, or Firm* — Rothwell, Figg, Ernst & Manbeck, P.C.

(57) ABSTRACT

A method of manufacturing a structure, the method comprising: obtaining a flowable liquid comprising a homogenous mixture of an active material and a binding material; generating a plurality of droplets from the flowable liquid; and depositing the plurality of generated droplets on a support, wherein the plurality of droplets self-assemble to form a continuous structure, wherein the continuous structure comprises a plurality of microstructure units, and wherein the active material and the binding material self-segregate to form a non-uniform distribution of the active material and the binding material in each of the units.

17 Claims, 15 Drawing Sheets

(56) References Cited

U.S. PATENT DOCUMENTS

| | | | | |
|---|---|---|---|---|
| 7,807,072 | B2* | 10/2010 | Choi | H01L 51/0022 |
| | | | | 252/511 |
| 9,508,995 | B2* | 11/2016 | Choi | H01M 8/1004 |
| 10,991,942 | B2 | 4/2021 | Yao et al. | |
| 10,998,553 | B1 | 5/2021 | Yao et al. | |
| 2011/0111292 | A1* | 5/2011 | Kwon | H01M 4/139 |
| | | | | 252/500 |
| 2015/0157569 | A1 | 6/2015 | Shum et al. | |
| 2016/0051954 | A1 | 2/2016 | Brujic et al. | |
| 2017/0216808 | A1 | 8/2017 | Lopez et al. | |
| 2020/0161628 | A1 | 5/2020 | Yao | |
| 2020/0344867 | A1 | 10/2020 | Lukens et al. | |
| 2021/0005876 | A1* | 1/2021 | Hibino | H01M 4/0419 |

OTHER PUBLICATIONS

Hebner, T. R., et al., Ink-jet printing of doped polymers for organic light emitting devices, Applied Physics Letters 72 (1998) 519-521; doi: 10.1063/1.120807.

Blazdell, P. F., and Evans, J. R. G., "Application of a continuous ink jet printer to solid freeforming of ceramics," Journal of Materials Processing Technology, 99 (2000) 94-102.

Jacobs, H. O. and Whitesides, George M., "Submicrometer Patterning of Charge in Thin-Film Electrets," Science 291 (2001) 1763-1766.

Zhao, Y., et al., "A novel and facile route of ink-jet printing to thin film $SnO_2$ anode for rechargeable lithium ion batteries," Electrochimica Acta 51 (2006) 2639-2645.

Xu, F. et al., "Preparing ultra-thin nano-$MnO_2$ electrodes using computer jet-printing method," Chemical Physics Letters 375 (2003) 247-251.

Yao, A., "Multilayered Electrode Architectures for Lithium-ion Batteries," EnPower, Inc., Dec. 7, 2020, Phoenix, AZ, 14 pages.

Berdichevsky, G., "The Future of Energy Storage—Towards A Perfect Battery with Global Scale," Sila Nanotechnologies Inc., Sep. 2, 2020, 23 pages.

International Search Report and Written Opinion in PCT/US22/15050 dated Jun. 14, 2022, 19 pages.

* cited by examiner

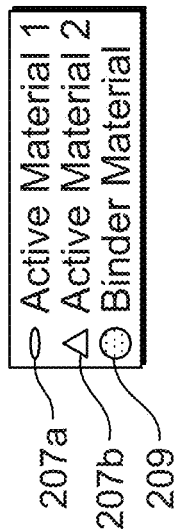
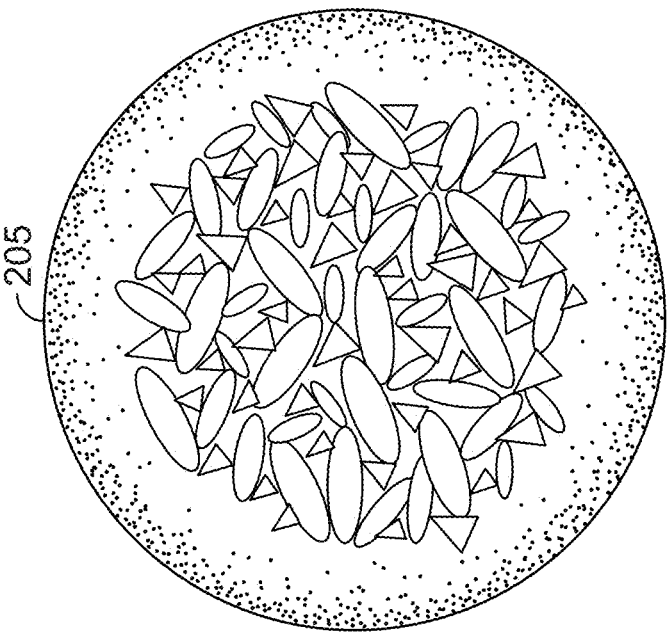
FIG. 2B
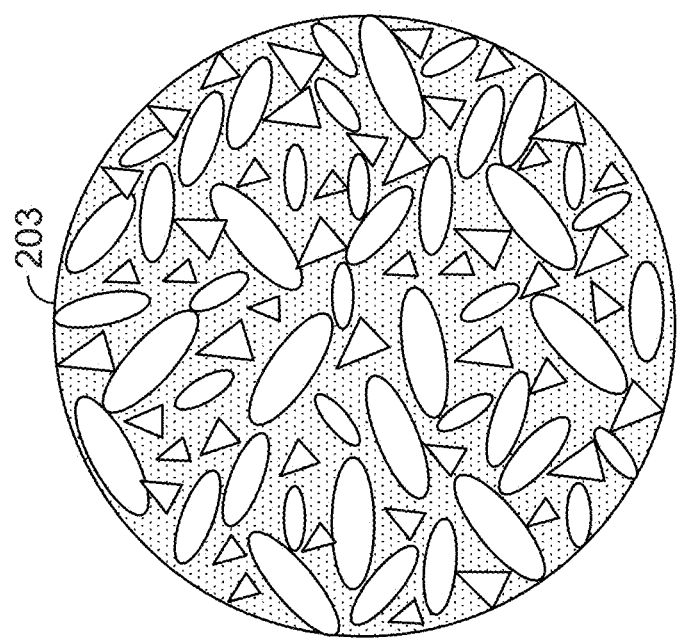
FIG. 2A

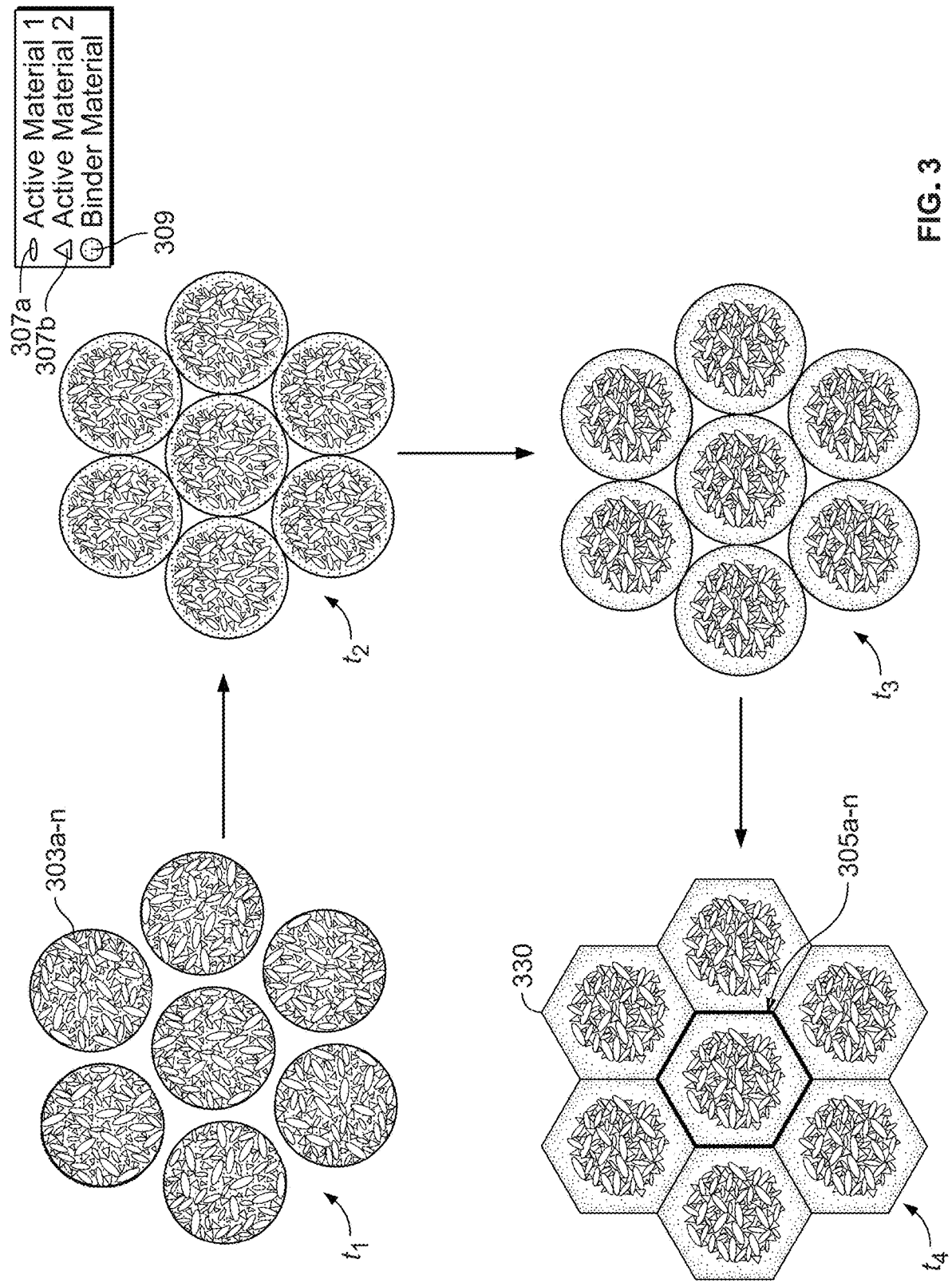

| Parameters | Ring Units | Filled Units |
|---|---|---|
| IR power | 80% | 80% |
| IR exposure | 20 mm/s | 8 mm/s |
| Number of layers before IR exposure | 1 | 2 |

FIG. 13

MICROSTRUCTURES AND METHODS OF MAKING AND USING THEREOF

CROSS-REFERENCE TO RELATED APPLICATIONS

This application claims the benefit of U.S. Provisional Application No. 63/199,950, filed Feb. 4, 2021. The entire contents of the above-identified application are hereby fully incorporated herein by reference.

TECHNICAL FIELD

The subject matter disclosed herein is generally directed to microstructures and methods of making and using thereof.

BACKGROUND

Many articles of manufacture or their components have various active materials coated on supports that are important for certain functions of the articles. The current methods of coating involve milling the active materials, typically in particulate-form, along with a binder material in a fluid to produce a flowable liquid that could then be sprayed, blade-cast, dip-coated, screen printed, etc., onto a support. The role of the binder is to provide physical integrity to the coated structure and adhesion to the support. A drying process could follow the coating step to drive off the fluid. The resulting coating microstructures are typically in the micrometer scale.

Alternatively, the active materials could be vaporized, either physically at high temperatures or chemically in a reactive vapor-form, onto a support. These vapor-deposited coatings are typically in the nanometer scale.

All these coating methods result in homogeneous coating microstructures where the active materials are distributed uniformly throughout the coating.

In some applications, such as in a battery electrode (e.g., an anode and/or cathode) may have a metal foil, a metallized polymer foil, or any other material capable of conducting electricity as support, on which a layer of a composite material containing one or more active materials and other elements is coated. The battery can be a primary or secondary battery, such as a lithium-ion battery or any other present or future electrochemical formula, having a structure of anode electrode, separator and cathode electrode. Such a battery can use a liquid, gel, solid or any other type of electrolyte responsible for transporting ions between the electrodes.

Existing techniques for electrode coating produce a homogeneous distribution of the active material and elements with no control at the micrometer or nanometer scale where the particles of the active material, the binding material or current enhancer are located spatially. Conventional electrodes are made from randomly sized, randomly oriented, and relatively poorly packed active materials, which create long and indirect paths through the electrolyte for the lithium ions to travel. In materials science these paths are described as "tortuous." [1] Gene Berdichevsky, Gleb Yushin, "The Future of Energy Storage, Towards a Perfect Battery with Global Scale" (Sila Nanotechnologies, Inc., Sep. 2, 2020). As described in [1], these tortuous paths are akin to not having rows of seats in the auditorium, just randomly distributed clusters of seats. Further, conventional electrodes also use an excessive amount of inactive materials, both polymer binders and conductive additives, because it is difficult to distribute those inactive materials to only where they are needed in the electrode, which are the points where particles touch one another.

Another example is in catalysis, it may be advantageous to have the active catalyst materials placed at or near the surface of the coating to enable chemical reactants to easily reach the active catalytic sites and for products of the chemical reaction to be easily transported away once the chemical reaction is completed.

With a homogeneous catalyst coating, the active catalyst sites that are placed deeper in the coating structure are less accessible to the chemical reactants and the products of the chemical reaction will also take longer to be transported away. Therefore, a uniform distribution of active catalyst sites does not always provide the optimum structure for catalysis.

Yet another example is in controlled release application where a compound, or a drug, is desired to be released in a controlled manner in a transport medium, such as a body fluid. With a homogeneous coating of the active drug material on a support, those active drug material placed at or near the surface of the coating will be released more quickly than those active drug material buried deeper in the coating microstructure leading to a non-uniform release of the active drug material. In this controlled release example, it may be more desirable to purposely place the active drug material deeper in the coating microstructure and not at the surface to effect a more uniform release of the active drug material.

SUMMARY

Thus, there is a need for producing coating materials with defined microstructures in which the spatial distribution of the active materials within the microstructures are controlled to provide optimal functions of the coating materials and the coated articles.

These and other aspects, objects, features, and advantages of the example embodiments will become apparent to those having ordinary skill in the art upon consideration of the following detailed description of illustrated example embodiments.

In one aspect, the present disclosure provides a method of manufacturing a structure, the method comprising: obtaining a flowable liquid comprising a homogenous mixture of an active material, and a binding material; generating a plurality of droplets from the flowable liquid; and depositing the plurality of generated droplets on a support, wherein the plurality of droplets self-assemble to form a continuous structure, wherein the continuous structure comprises a plurality of microstructure units, and wherein the active material and the binding material self-segregate to form a non-uniform distribution of the active material and the binding material in each of the units.

In some embodiments, the active material imparts a physical, thermal, chemical, catalytic, electrical, magnetic, radioactive, photonic, biological, or combinations thereof property to the continuous structure. In some embodiments, the active material imparts an electrical property to the continuous structure, and the active material comprises one or more of a conductor, semiconductor, or insulator. In some embodiments, the active material distributes within an area in each microstructure unit bounded by the respective unit. In some embodiments, the active material distributes non-uniformly within the area of each of the units.

In some embodiments, the binding material is an organic material, inorganic material, or combinations thereof. In some embodiments, the binding material self-segregates to accumulate at edges of the units. In some embodiments, the active material accumulates adjacent to a boundary formed by the binding material. In some embodiments, a center of a respective unit is hollow and contains no active material or binding material. In some embodiments, the binding material comprises a liquid carrier. In some embodiments, the liquid carrier comprises an inorganic composition or organic composition.

In some embodiments, the method further comprises polymerizing the binding material. In some embodiments, the polymerizing is performed by heat or irradiation.

In some embodiments, the flowable liquid further comprises a material configured to change a surface charge of at least one of the active material or the binding material. In some embodiments, the material configured to change a surface charge of at least one of the active material or the binding material comprises a coupling agent. In some embodiments, the flowable liquid further comprises a material configured to change a zeta potential of the active material. In some embodiments, the material configured to change a zeta potential of at least one of the active material comprises a surfactant or a dispersant.

In some embodiments, the generated droplets have an average volume in the range of 0.1 picoliters to 3000 picoliters. In some embodiments, the units have an average diameter from 0.04 micrometers to 2000 micrometers. In some embodiments, the support comprises a metallic film, metallized plastic film, metallized polymer film, glass film, ceramic film, polymer film, or paper.

In some embodiments, the method further comprises controlling sizes of the droplets. In some embodiments, the controlling sizes of the droplets comprises applying force to the flowable liquid. In some embodiments, the force comprises mechanical pressure, collision with another liquid or fluid, ultrasonic waves, electrical charge, or a combination thereof. In some embodiments, the controlling sizes of the droplets comprises forcing the flowable homogenous liquid through orifices or openings of different sizes. In some embodiments, the method further comprises controlling at least one of the volume or a position of the droplets by a digitally controlled tool. In some embodiments, the flowable liquid has a viscosity from 3 centipoise to 1500 centipoise.

In some embodiments, the continuous structure comprises a layer comprising a plurality of the units along a planar surface of the support. In some embodiments, the continuous structure comprises a plurality of stacked layers along a planar surface of the support and each stacked layer comprises a plurality of the units. In some embodiments, an average diameter in a first layer of the plurality of stacked layers is different than an average diameter of the microstructure units in a second layer of the plurality of stacked layers. In some embodiments, a first layer of the plurality of stacked layers comprises one or more of: a material that is different than one or more materials in a second layer of the plurality of stacked layers, or an active material that is the same as an active material in the second layer of the plurality of stacked layers, and the active material in the first layer has having a different physical, chemical, catalytic, electrical, magnetic, radioactive, photonic, biological, or combinations thereof characteristic than the same active material in the second layer of the plurality of stacked layers.

In some embodiments, each microstructure unit comprises an area bounded by at least three sides. In some embodiments, a subset of the plurality of microstructure units comprise an area bounded by six sides to form a honeycomb cell. In some embodiments, the subset comprises a majority of the plurality of microstructure units. In some embodiments, each unit has a vertical aspect ratio equal to or greater than 1.

In some embodiments, the active material is a compound comprising lithium. In some embodiments, the active material intercalates lithium ions or has a conversion reaction in the presence of lithium ions. In some embodiments, the support is comprised in a cathode, anode, separator, solid electrolyte, or semi-solid electrolyte.

In some embodiments, the active material is an active catalyst capable of causing or accelerating a chemical reaction between reactants and wherein the reactants and a product of the chemical reaction are transported through the microstructure units. In some embodiments, the active material is an active adsorbent capable of selectively binding to an adsorbate and wherein a medium carrying the adsorbate is transported through the microstructure units. In some embodiments, the active adsorbent gives a response when binding to an adsorbate, and wherein the response comprises a change in at least one of a physical, chemical, electrical, optical or magnetic property of the active adsorbent. In some embodiments, the active material is an active carrier of a compound, and wherein at least a part of the compound can be released in a controlled manner when contacted with a transport medium, and wherein the transport medium is transported through the microstructure units. In some embodiments, the active material is an active carrier of a photo-sensitive compound, and wherein the photo-sensitive compound gives an optical response when excited photonically. In some embodiments, the active material is an active carrier of a magnetic-sensitive compound, and wherein the magnetic-sensitive compound gives a magnetic response when excited magnetically. In some embodiments, the active material is an active carrier of a pigment, and wherein the pigment gives an optical response when excited with visible, ultraviolet or infrared light. In some embodiments, the active material self-segregates to accumulate at edges of the units.

In another aspect, the present disclosure provides a structure comprising a plurality of microstructure units, wherein each of the units comprises a binding material self-segregated from an active material to form a non-uniform distribution of the binding material and the active material in each of the units. In some embodiments, the active material imparts a physical, thermal, chemical, catalytic, electrical, magnetic, radioactive, photonic, biological property, or a combination thereof to the structure. In some embodiments, the active material is distributed within an area in each microstructure unit bounded by the respective unit. In some embodiments, the active material is distributed non-uniformly within the area of each unit.

In some embodiments, the binding material comprises an organic material, an inorganic material, or a combination thereof. In some embodiments, the binding material self-segregates to accumulate at edges of the units. In some embodiments, the active material accumulates adjacent to a boundary formed by the binding material. In some embodiments, a center of a respective unit is hollow and contains no active material or binding material. In some embodiments, the units have an average diameter from 0.04 micrometers to 2000 micrometers.

In some embodiments, the structure comprises a continuous planar layer. In some embodiments, the structure comprises a plurality of stacked planar layers. In some embodiments, a first layer comprises an active material that is the same as an active material of a second layer of the plurality of stacked layers and the first layer has different particle size characteristics than the second layer of the plurality of stacked layers.

In some embodiments, each microstructure unit comprises an area bounded by at least three sides. In some embodiments, a subset of the plurality of microstructure units comprise an area bounded by six sides to form a honeycomb cell. In some embodiments, the subset comprises a majority of the plurality of microstructure units. In some embodiments, each unit has a vertical aspect ratio equal or greater than 1.

In some embodiments, the active material intercalates lithium ions or has a conversion reaction in the presence of lithium ions. In some embodiments, the active material is an active catalyst capable of causing or accelerating a chemical reaction between reactants and wherein the reactants and a product of the chemical reaction are transported through the microstructure units. In some embodiments, the active material is an active adsorbent capable of selectively binding to an adsorbate and wherein a medium carrying the adsorbate is transported through the microstructure units. In some embodiments, the active adsorbent gives a response when binding to an adsorbate, and wherein the response comprises a change in a physical, chemical, electrical, optical and magnetic property of the active adsorbent. In some embodiments, the active material is an active carrier of a compound, and wherein at least a part of the compound can be released in a controlled manner when contacted with a transport medium, and wherein the transport medium is transported through the microstructure units. In some embodiments, the active material is an active carrier of a photo-sensitive compound, and wherein the photo-sensitive compound gives an optical response when excited photonically. In some embodiments, the active material is an active carrier of a magnetic-sensitive compound, and wherein the magnetic-sensitive compound gives a magnetic response when excited magnetically. In some embodiments, the active material is an active carrier of a pigment, and wherein the pigment gives an optical response when excited with visible, ultraviolet or infrared light.

In another aspect, the present disclosure provides an article of manufacture comprising the structure described herein of any one or combination thereof. In some embodiments, the article further comprises a support coated by the structure. In some embodiments, the support comprises a metallic film, metallized plastic film, metallized polymer film, glass film, ceramic film, polymer film, or paper.

In some embodiments, the article is an electrochemical cell. In some embodiments, the electrochemical cell comprises an electrode comprising the structure. In some embodiments, the structure comprises a conductive material. In some embodiments, the support is comprised in a cathode, anode, separator, solid electrolyte, or semi-solid electrolyte.

In another aspect, the present disclosure provides a composition comprising a flowable liquid comprising a homogenous mixture of an active material and a binding material, wherein, when droplets of the composition are deposited on a support, the droplets self-assemble to form a continuous structure, wherein the continuous structure comprises a plurality of microstructure units, and wherein the binding and active materials self-segregate to form a non-uniform distribution of materials in each of the units.

In some embodiments, the active material imparts a physical, thermal, chemical, catalytic, electrical, magnetic, radioactive, photonic, biological property, or a combination thereof to the continuous structure. In some embodiments, the binding material comprises an organic material, inorganic material, or a combination thereof. In some embodiments, the binding material self-segregates to accumulate at edges of the units.

In some embodiments, the binding material comprises a liquid carrier. In some embodiments, the liquid carrier comprises an organic composition, an inorganic composition, or a combination thereof.

In some embodiments, the flowable liquid further comprises a material configured to change a surface charge of at least one of the active material or the binding material. In some embodiments, the material configured to change a surface charge of at least one of the active material or the binding material comprises a coupling agent. In some embodiments, the flowable liquid further comprises a material configured to change a zeta potential of the active material. In some embodiments, the material configured to change a zeta potential of the active material comprises a surfactant and/or a dispersant. In some embodiments, a mass ratio between the active material and the binding material is from 0.000001 to 1000000. In some embodiments, the flowable liquid has a viscosity from 3 centipoise to 1500 centipoise.

In another aspect, the present disclosure provides a method of manufacturing a structure, the method comprising: obtaining a flowable liquid comprising a homogenous binding material; generating a plurality of droplets from the flowable liquid; and depositing the plurality of generated droplets on a support, wherein the plurality of droplets self-assemble to form a continuous structure, wherein the continuous structure comprises a plurality of microstructure units, and wherein the binding material self-segregates to form a non-uniform distribution of the binding material in each of the units.

In another aspect, the present disclosure provides a structure comprising a plurality of microstructure units, wherein each of the units comprises a binding material self-segregated to form a non-uniform distribution of the binding material in each of the units. In another aspect, the present disclosure provides an article of manufacture comprising the structure. In some embodiments, the article further comprises a support coated by the structure. In some embodiments, the support comprises a polymer film.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 2A shows a droplet 203 containing a homogeneous liquid containing active materials 207a and 207b and a binding material 209, according to some embodiments.

FIG. 2B illustrates self-segregation of the active materials 207a and 207b and the binding material 209 to form a non-uniform distribution of the active material and the binding material in a microstructure unit 205, according to some embodiments.

FIG. 3 illustrates self-assembly and self-segregation of liquid droplets 303a-n to form a structure 330, according to some embodiments.

FIG. 13 is a chart comparing structures manufactured with two different drying processes, according to some embodiments.

Figure 1:
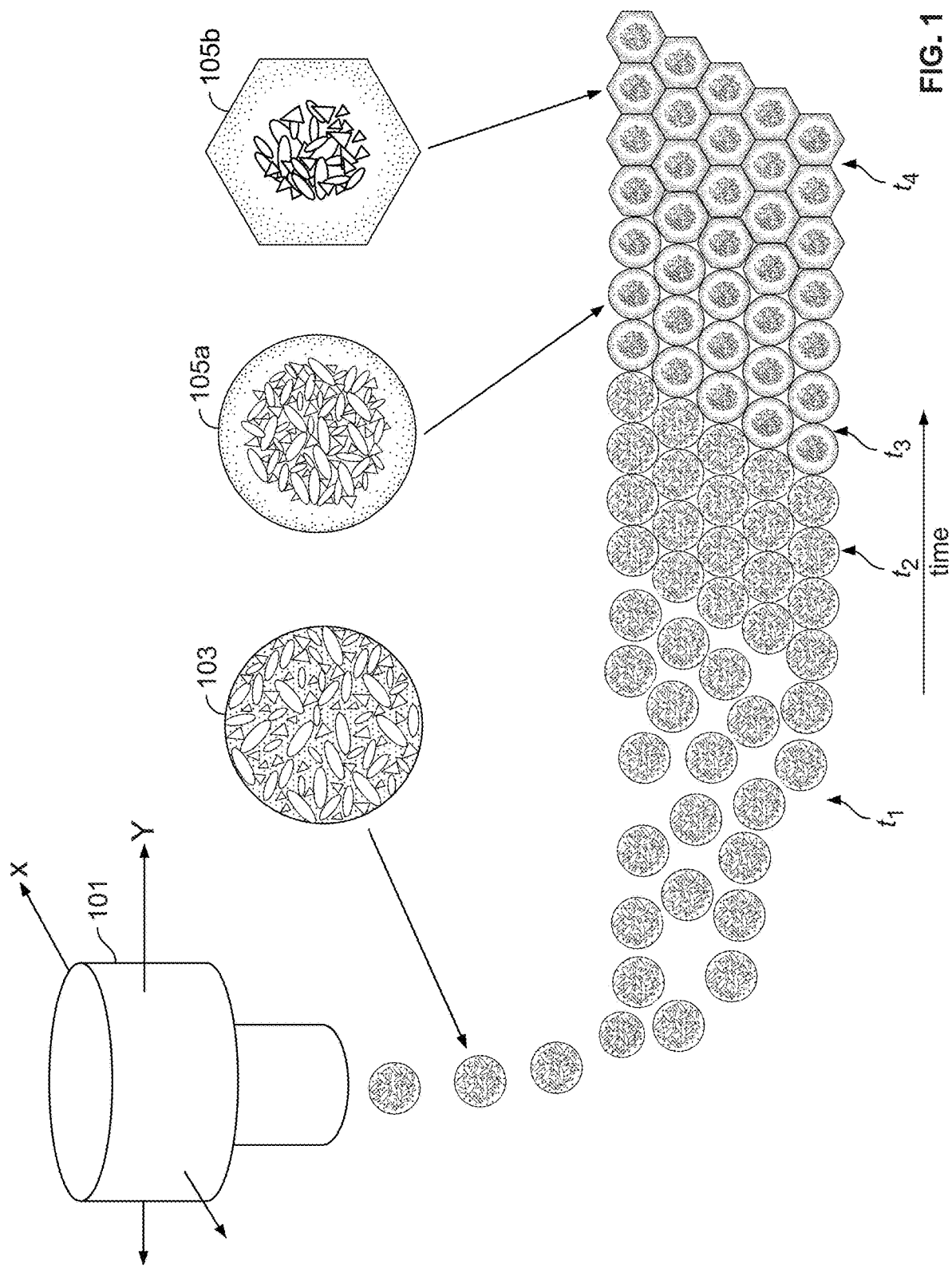
FIG. 1 illustrates a process for manufacturing a structure, according to some embodiments.

The figures herein are for illustrative purposes only and are not necessarily drawn to scale.

DETAILED DESCRIPTION

The present disclosure provides a structure with microstructure units whose properties may be controlled during the manufacture process. The manufacturing process may involve preparing a liquid comprising an active material and a binding material that can be dispensed as droplets onto a support, where such droplets may self-assemble to form microstructure units in a continuous coating. Furthermore, the binding material may self-segregate from the active material so that the active material and/or binding material non-uniformly distribute in each of the microstructure units. The present disclosure further provides a method of manufacturing the structure, with which the non-uniform distribution of the active material and/or the binding material may be controlled to form microstructure units with desired properties.

In some embodiments, the self-assembly and self-segregation of the active material and the binding material may give rise to a number of phenomena. The self-assembly of droplets, containing the active material and the binding material, may create unique microstructure units in a continuous coating. In some battery applications, the active material may comprise a lithium intercalation or conversion material, or other electrical charge carrying species, to form the cathode and/or the anode electrode. The self-segregation of the binding material that may not participate in ion diffusion, may greatly decrease the tortuosity of the conductive pathways, thereby creating an additional "secondary pore network" to enhance ion mass transport. This secondary pore network may have the effect of increasing the power density and charging speeds of the battery without compromising the energy density of the electrode. The self-segregation of the binding material to or near the edges of the microstructure unit may add structure strength to the microstructural unit, thereby increasing the mechanical integrity of the electrode. Also, the self-segregation of the active material may increase the particle-to-particle contact of the active material, thereby increasing the electrical conductivity of the electrode.

In some embodiments, the structure may be coated on an electrode of a battery. The physical properties of the microstructure of the electrode coating may provide higher power density compared to an electrode coated with the same material but without the microstructure.

The applications of the method and the structure provided herein are not limited to batteries. For example, the method and the structure may be used in catalyst applications, pharmaceutical products, aerospace technologies, medical devices, and consumer goods, among others. For example, in a catalyst application, deliberate placement of the active catalyst materials near the surface of the microstructure units may allow the chemical reactants easy access to the active catalyst sites while allowing products of the chemical reaction to be transported away quickly from the active catalyst sites.

In one aspect, the present disclosure provides a method of manufacturing the structure described herein. In general, the method may comprise obtaining a flowable liquid comprising an active material and a binding material (e.g., a homogenous mixture of an active material and a binding material), generating a plurality of droplets from the flowable liquid, and depositing the plurality of droplets generated from the flowable liquid on a support. When deposited on the support, the plurality of droplets may self-assemble to form a continuous structure, which comprises a plurality of microstructure units, and the active material and the binding material may self-segregate to form a non-uniform distribution of the materials in each of the units.

FIG. 1 illustrates a process for manufacturing a structure, according to some embodiments. In this example, a nozzle 101 may be used to generate and dispense a plurality of droplets 103 of a composition for manufacturing the structure. The nozzle 101 may be controlled to move along the x, y, and/or z directions to deposit the droplets 103 to desired locations on a support. FIG. 1 illustrates the process occurring over time, including at time intervals $t_1$-$t_4$, as described in further detail below in connection with FIG. 3.

In some embodiments, the composition for manufacturing the structure may comprise a flowable liquid comprising an active material and a binding material. For example, the flowable liquid may comprise a homogenous mixture of an active material and a binding material.

In some embodiments, the flowable liquid may comprise a liquid carrier. For example, the binding material may comprise the liquid carrier. When the composition is deposited on a support, the liquid carrier may be allowed to evaporate to facilitate the formulation of the structure. In some examples, the liquid carrier may comprise an organic composition. For example, the liquid carrier may be an organic solvent, e.g., N-Methylpyrrolidone. In some examples, the liquid carrier may comprise an inorganic composition. In some examples, the liquid carrier may comprise a mixture or a combination of an organic composition and an inorganic composition.

In some embodiments, the flowable liquid may comprise a material configured to change the surface charge of the active material and/or the binding material. In some examples, the material may be configured to change the surface charge of the active material. In some examples, the material may be configured to change the surface charge of the binding material. In some examples, the material may comprise a coupling agent (e.g., an agent capable of enhancing adhesion or bonding between two materials). For example, the coupling agent may be silane (e.g., binary silicon-hydrogen compounds and compounds with four substituents on silicon, including organosilicon compounds). Examples of silanes include trichlorosilane ($SiHCl_3$), tetramethylsilane ($Si(CH_3)_4$), and tetraethoxysilane ($Si(OC_2H_5)_4$)).

In some embodiments, the flowable liquid may comprise a material configured to change the zeta potential of the active material. In some examples, such a material may comprise a surfactant (e.g., a substance or compound comprising a hydrophobic tail and a hydrophilic head). Examples of surfactants include sodium stearate, 4-(5-dodecyl)benzenesulfonate, docusate (dioctyl sodium sulfosuccinate), alkyl ether phosphates, benzalkaonium chloride (BAC), perfluorooctanesulfonate (PFOS), (2,4,4-trimethylpentan-2-yl)phenoxy]ethanol, Octyl phenol ethoxylate, and hexadecyltrimethylammonium bromide (CTAB). In some examples, such a material may comprise a dispersant (e.g., a substance or compound, when added to a suspension of particles, capable of improving the separation of the particles and preventing their settling or clumping). Examples of dispersants include sodium pyrophosphate, ammonium citrate, sodium citrate, sodium tartrate, sodium succinate, glyceryl trioleate, phosphate ester, random copolymers, comb polymers, poly(acrylic acid) (PAA), poly(methacrylic acid) (PMAA), ammonium polyacrylate, sodium polyacrylate, sodium polysulfonate, and poly(ethylene imine). In some examples, the dispersants may act sterically not only changing zeta potential. The surfactants may disperse and change/adjust surface tension.

In some embodiments, in the flowable liquid, a mass ratio between the active material and the binding material may be from 0.000001 to 1000000, e.g., from 0.000001 to 0.000005, from 0.000005 to 0.00001, from 0.00001 to 0.00005, from 0.00005 to 0.0001, from 0.0001 to 0.0005, from 0.0005 to 0.001, from 0.001 to 0.005, from 0.005 to 0.01, from 0.01 to 0.05, from 0.05 to 0.1, from 0.1 to 0.5, from 0.5 to 1, from 1 to 5, from 5 to 10, from 10 to 50, from 50 to 100, from 100 to 500, from 500 to 1000, from 1000 to 5000, from 5000 to 10000, from 10000 to 50000, from 50000 to 100000, from 100000 to 500000, or from 500000 to 1000000.

In some embodiments, the flowable liquid may have a viscosity from 1 to 2000 centipoise, e.g., from 3 to 1500, from 3 to 50, from 50 to 100, from 100 to 200, from 200 to 300, from 300 to 400, from 400 to 500, from 500 to 600, from 600 to 700, from 700 to 800, from 800 to 900, from 900 to 1000, from 1000 to 1100, from 1100 to 1200, from 1200 to 1300, from 1300 to 1400, or from 1400 to 1500 centipoise.

In some embodiments, the nozzle 101 of FIG. 1 generates and dispenses droplets 103 containing a homogenous mixture of one or more active materials and a binding material. As described in further detail below in connection with FIGS. 2-3, each droplet 103 may self-assemble to form a continuous structure with many units 105a, 105b, where the active material and the binding material self-segregate to form a non-uniform distribution of the active material and the binding material in each of the units. The units may be in the form of a honeycomb cell as shown with unit 105b, and in other embodiments the units may have fewer edges (or no edges) such as shown with unit 105a.

The generated droplets 103 may have a volume suitable for manufacturing the structure. In some embodiments, the generated droplets may have an average volume from 0.1 to 5000 picoliters, e.g., from 0.1 to 3000, from 0.1 to 100, from 100 to 250, from 250 to 500, from 500 to 750, from 750 to 1000, from 1000 to 1250, from 1250 to 1500, from 1750 to 2000, from 2000 to 2250, from 2250 to 2500, from 2500 to 2750, from 2750 to 3000, from 1 to 100, from 1 to 80, from 1 to 60, from 1 to 50, from 2 to 50, from 3 to 50, from 3 to 10, from 5 to 15, from 10 to 20, from 15 to 25, from 20 to 30, from 25 to 35, from 30 to 40, from 35 to 45, or from 40 to 50 picoliters. In some examples, the generated droplets may have an average volume from 0.1 to 3000 picoliters. In some examples, the generated droplets may have an average volume from 3 to 50 picoliters.

The method may further comprise controlling the sizes of the generated droplets 103. In some embodiments, the sizes of the droplets may be controlled by applying force to the flowable liquid. For example, the force may be mechanical pressure, collision with another liquid or fluid, ultrasonic waves, electrical charge, or a combination thereof. In some examples, the sizes of the droplets may be controlled by forcing the flowable homogenous liquid through orifices or openings of different sizes.

In some embodiments, the volume of the droplets may be controlled by a digitally controlled tool. During the manufacturing process, the position of the droplets deposited on the surface may be controlled by a digitally controlled tool as well. In some examples, the droplets may be generated and deposited by a printing technology (e.g., a 3D printing technology, drop-on-demand industrial inkjet printing technology, digital printing technology, or computer-controlled ink-jet printing technology), digital fabrication technology, or digital deposition technology. Examples of printing technologies include those described in Hebner, T R et al., (1998) Appl. Phys. Lett., 72, 519-521(1998), Blazdell, P F et al., Mater. Process. Technol., 99, 94-102 (2000), Jacobs, HO, Science, 291, 1763-1766 (2001), Zhao, Y et al., Electrochim. Acta, 51, 2639-2645 (2006), and Xu, F et al., Chem. Phys. Lett., 375, 247-251 (2003), which are incorporated by reference herein in their entireties. In some examples, the methods and compositions described herein may allow a synthesis control of electrodes at the micro scale level, and obtaining 3D structures which improve the battery performance.

While not illustrated in FIG. 1, in some embodiments, the method may further comprise polymerizing the binding material. For example, the binding material may be polymerized by heat or irradiation. In some examples, the polymerization may be performed after the binding material and the active material self-segregate to fix the position or distribution pattern of the binding material and/or the active material.

FIG. 2A shows a droplet containing a homogeneous liquid containing an active material and a binding material, according to some embodiments. In some embodiments, a generated droplet 203 may comprise a plurality of active materials and/or a plurality binding materials. In the example shown in FIG. 2A, the droplet 203 contains a first active material 207a, a second active material 207b, and a binding material 209, which are uniformly distributed in the droplet 203.

FIG. 2B illustrates self-segregation of the active material and the binding material to form a non-uniform distribution of the active material and the binding material in a microstructure unit, according to some embodiments. FIG. 2B shows that, after the droplet 203 is deposited on a support, the active materials 207a-b and binding material 209 self-segregate to form a non-uniform distribution of the active material and the binding material in the microstructure unit 205 formed by the droplet. As illustrated in FIG. 2B, the binding material 209 has self-segregated from the active materials, and has accumulated primarily at the edges of the microstructure unit 205.

In some embodiments a structure comprises a plurality of microstructure units 205. The structure may comprise an active material and a binding material. The active material and the binding material may self-segregate when being deposited on a surface or support when forming the structure. When segregated from the active material, the binding material may accumulate at certain areas of the units. Similarly, when segregated from the binding material, the active material may accumulate at certain areas of the units, which may be the same or different from the areas where the binding material accumulates. Such self-segregation of the active material and the binding material may cause non-uniform distribution of the materials in the structure, which form a microstructure comprising a plurality of units. The non-uniform distribution may be controlled by the manufacturing process so that the microstructure units have desired properties, e.g., a desired physical, thermal, chemical, catalytic, electrical, magnetic, radioactive, photonic, or biological property, or any combination thereof. Each of the microstructure units may comprise an active material and a binding material. In some embodiments, each of the units may comprise more than one active material and/or more than one binding material.

FIG. 3 illustrates self-assembly and self-segregation of liquid droplets to form a structure, according to some embodiments. FIG. 3 illustrates an example of self-assembly of the droplets 303a-n occurring over time, beginning at time $t_1$ and ending at time $t_4$. The droplets 303a-n contain a first active material 307a, a second active material 307b, and a binder material 309 in FIG. 3. However, in other embodiments, there may be only one active material and/or one binder material. In this example, $t_1$ illustrates the droplets 303a-n shortly after deposition on a support or surface as described above in connection with FIG. 1. As shown at times $t_2$ and $t_3$, the droplets 303a-n begin to self-assemble to form a continuous structure. The self-assembly process may be guided by manipulation of capillary flow and evaporation of the droplets 303a-n. In addition, at times $t_2$ and $t_3$, the active material and the binding material self-segregate in each of the droplets as described above in connection with FIGS. 2A-B. The process of self-assembly continues from $t_1$ to $t_4$ to form a continuous structure comprising microstructure units 305a-n, where each microstructure unit contains a non-uniform distribution of the active and the binding materials.

The self-assembly of the droplets may be driven by the reduction of surface energy. Droplets may tend to coalesce and self-assemble to forms with the lowest surface energy. The self-segregation in a mixture of materials may be driven by surface charge properties. Coulombic repulsion may dominate when the surface charges are similar leading to self-segregation. On the other hand, if surface charges are dissimilar, coulombic attraction may dominate, leading to self-coalescence. The ways to alter surface charge properties of a material may be to introduce a surfactant to enhance steric hindrance or add a coupling agent such as a silane.

In some examples, the self-segregated binding material may accumulate at edges of the units. The active material may be distributed within an area in each microstructure unit bounded by the respective unit. In some examples, the active material may be distributed non-uniformly within the area of each unit.

Figure 4A:
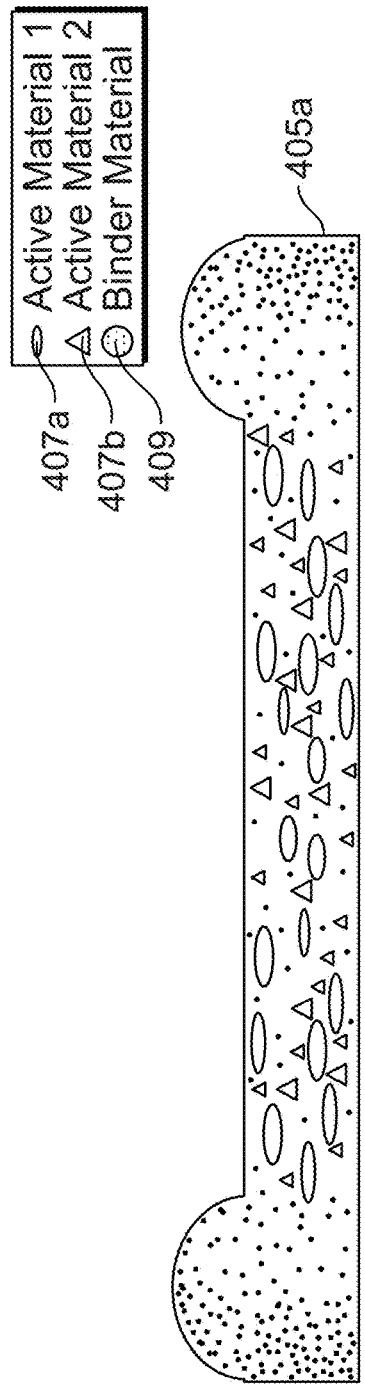
FIGS. 4A-4C illustrate cross sections of microstructure units 405a-c, according to some embodiments.
Figure 4B:
Figure 4C:
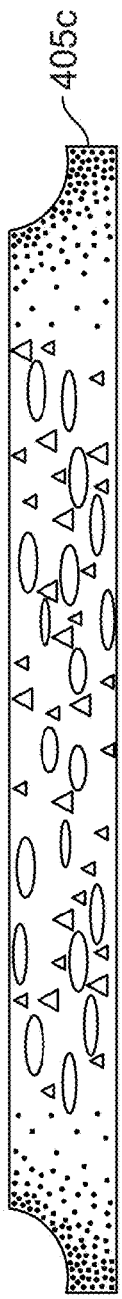

FIGS. 4A-4C illustrate cross sections of microstructure units, according to some embodiments. In all the microstructure units 405a-c in FIGS. 4A-4C, the active materials 407a-b accumulate at the center of the unit and the binding material 409 accumulates at the edges of the units. The edge of the microstructure unit may be elevated (e.g., FIG. 4A), even (e.g., FIG. 4B), or lower (e.g., FIG. 4C) than the center of the unit.

The microstructure units may be three-dimensional open-ended cells. In some embodiments, some or all of the microstructure units may comprise an area bounded by at least 3 sides, e.g., by 3, 4, 5, 6, 7, 8, 9, 10 or more sides. In some examples, the lengths of the sides may be substantially the same. In one example, a subset or all of the microstructure units (e.g., a majority of the microstructure units in the structure such as at least 50%, 60%, 70%, 80%, 90%, 95%, or 99% of the microstructure units in the structure) may comprise an area bounded by 6 sides. Such units may be bound by 6 sides with substantially the same length, e.g., in the shape of honeycomb cells.

In some embodiments, the units may have an average diameter from 0.01 to 3000 micrometers, e.g., from 0.02 to 2000, from 0.04 to 2000, from 0.04 to 1500, from 0.04 to 1000, from 0.04 to 500, from 1 to 500, from 5 to 500, from 10 to 500, from 20 to 500, from 25 to 500, from 25 to 100, from 40 to 80, from 50 to 70, from 45 to 55, from 50 to 60, from 55 to 65, from 60 to 70, from 65 to 75, from 70 to 80, from 25 to 50, from 50 to 100, from 100 to 150, from 150 to 200, from 200 to 250, from 250 to 300, from 300 to 350, from 350 to 400, from 400 to 450, or from 450 to 500, from 500 to 750, from 750 to 1000, from 1000 to 1250, from 1250 to 1500, from 1500 to 1750, or from 1750 to 200 micrometers. In one example, the units may have an average diameter from 50 to 70 micrometers, e.g., from 50 to 55, from 55 to 60, from 60 to 65, or from 65 to 70 micrometers.

In some embodiments, the unit each microstructure in the structure may have a vertical aspect ratio (e.g., the ratio of the thickness to the diameter of the unit) equal to or greater than 1, e.g., equal to or greater than 1.2, 1.4, 1.6, 1.8, 2, 2.2, 2.4, 2.6, 2.8, 3, 3.5, 4, 4.5, or 5.

In some embodiments, the structure may be a continuous structure. The structure may comprise a continuous layer (e.g., a continuously planar layer). The layer may be along a planar surface of a support. In some embodiments, the structure may comprise a plurality of stacked layers (e.g., stacked planar layers).

Figure 5:
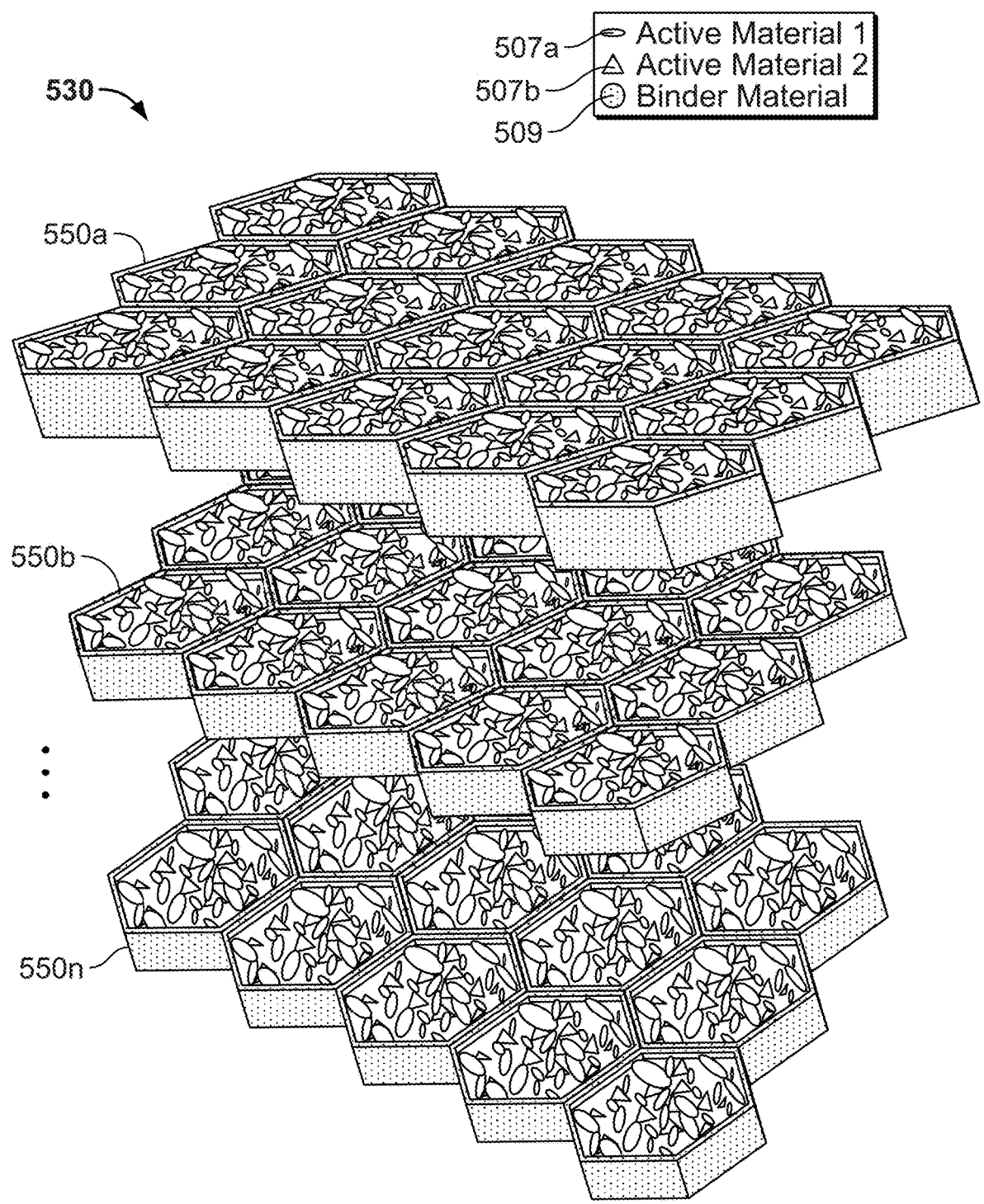
FIG. 5 illustrates multiple layers 550a-n of a structure 530, according to some embodiments.

FIG. 5 illustrates multiple layers of a structure, according to some embodiments. FIG. 5 illustrates a structure 530 with multiple layers 550a-n. Each layer 550 includes microstructure units including a first active material 507a, a second active material 507b, and a binder material 509.

In some embodiments, the structure may comprise at least 2, 5, 10, 50, 100, 150, 200, 250, 300, 350 stacked layers (e.g., stacked planar layers). In some examples, the first layer of the stacked layers may comprise an active material that is the same as an active material of a second layer of the stacked layers, and the first layer has different particle size characteristics than the second layer of the plurality of stacked layers. In some examples, the average diameters of the units on at least two layers may be different. In some examples, the average diameters of the units on at least two layers may be the same. In some examples, a first layer of the plurality of stacked layers may comprise a material that is different than one or more materials in a second layer of the plurality of stacked layers, or the same active material having a different physical, chemical, catalytic, electrical, magnetic, radioactive, photonic, biological, or combinations thereof characteristic in a second layer of the plurality of stacked layers.

The active material may be any material that serves a function. The active material may provide a function of the structure. For example, the active material may impart a physical, thermal, chemical, catalytic, electrical, magnetic, radioactive, photonic, or biological property, or a combination thereof to the structure. In one example, the active material imparts a physical property to the structure (e.g., material densities, porosities, strength, shapes, etc.). In another example, the active material may impart a thermal property to the structure. In another example, the active material may impart a chemical property to the structure. In another example, the active material may impart a catalytic property to the structure. In another example, the active material may impart an electrical property to the structure. In another example, the active material may impart a magnetic property to the structure. In another example, the active material may impart a radioactive property to the structure. In another example, the active material may impart a photonic property to the structure. In another example, the active material may impart a biological property to the structure.

In some embodiments, the active material may intercalate ions (e.g., lithium ions) or have a conversion reaction in the presence of ions (e.g., lithium ions). For example, the active material may facilitate the chemical reaction in which ions (e.g., lithium ions) are inserted into a host matrix with essential retention of the crystal structure. In some embodiments, the active materials may comprise transition metals (e.g., nickel, cobalt, manganese, copper, zinc, vanadium, chromium, iron), and their oxides, phosphates, phosphites, sulfides, and silicates, as well as alkalines and alkaline earth metals, aluminum, aluminum oxides, and aluminum phosphates. Examples of active materials include $LiCoO_2$, $LiMn_2O_4$, $LiFePO_4$, $LiNi_{1/3}Mn_{1/3}Co_{1/3}O_2$ $LiNi_{0.8}Co_{0.15}Al_{0.05}O_2$, $LiC_6$, $Li_4Ti_5O_{12}$, $LiNiCoAlO_2$, $LiNiCoMnO_2$, $LiNi_{0.5}Mn_{1.5}O_4$, $Li_2TiO_3$, $Li(Ni_{0.5}Mn_{1.5})O_2$, $Li_2S$, graphite (artificial or natural), hard carbon, titanate, titania, transition metals in general, halides, and/or chalcogenides, silicon, and other elements in group 14 (e.g., tin, germanium, etc.). In some examples, the active material may comprise $LiFePO_4$. In some embodiments, the active material may be an insulator.

In some embodiments, the active material may be an active catalyst capable of causing or accelerating a chemical reaction between reactants, and the reactants and/or the products of the chemical reaction may be transported through the microstructure units. In some examples, the catalyst may be an enzyme or a chemical catalyst.

In some embodiments, the active material may be an active adsorbent capable of selectively binding to an adsorbate, and a medium carrying the adsorbate may be transported through the microstructure units. An active adsorbent may be a material (e.g., solid or semi-solid material) capable of bind to (e.g., selectively bind to) an adsorbate, which may be a gas, or dissolved substance or suspended particle in a solution, or a mixture thereof. In some embodiments, the active adsorbent may give a response when binding to an adsorbate. Such response may be a change in physical, chemical, electrical, optical, or magnetic properties, or any combination thereof of the adsorbent. In some examples, such a response may be a measurable response, e.g., a light, sound, electrical signal.

In some embodiments, the active material may be an active carrier of a compound, and wherein at least a part of the compound may be released in a controlled manner when contacted with a transport medium, and the transport medium may be transported through the microstructure units. For example, the transport medium may be capable of transporting the compound through the microstructure units. The transport medium may be in a gaseous, liquid or solid state. In one example, the transport medium may be a body fluid (e.g., blood, urine, or saliva).

In some embodiments, the active material may be an active carrier of a photo-sensitive compound, and the photo-sensitive compound may give an optical response when excited photonically. Examples of photo-sensitive compounds include fluorescent dyes.

In some embodiments, the active material may be an active carrier of a magnetic-sensitive compound. The magnetic-sensitive compound may give a magnetic response when excited magnetically. In some embodiments, the active material may be an active carrier of a pigment. The pigment may have an optical response (e.g., generating an optical signal) when excited (e.g., with visible, ultraviolet or infrared light).

The binding material may be any material capable of facilitating the adherence of particles in the active material in the structure. In some examples, the binding material may comprise an organic material. In some examples, the binding material may comprise an inorganic material. In some examples, the binding material may comprise a combination or mixture of an organic material and an inorganic material. In one example, the binding material may be a polymer, e.g., polyvinylidene difluoride (PVdF), carboxyl-methyl cellulose (CMC), styrene-butadiene rubber (SBR), or a mixture or combination thereof.

The structure may comprise one or more additional components needed for a particular function. In some embodiments, the structure may comprise one or more conductive materials. Examples of conductive materials include carbon (e.g., nanometer-sized carbon) such as carbon black, graphite, ketjen black, a graphitic carbon, a low dimensional carbon (e.g., carbon nanotubes), and/or a carbon fiber.

Figure 6:
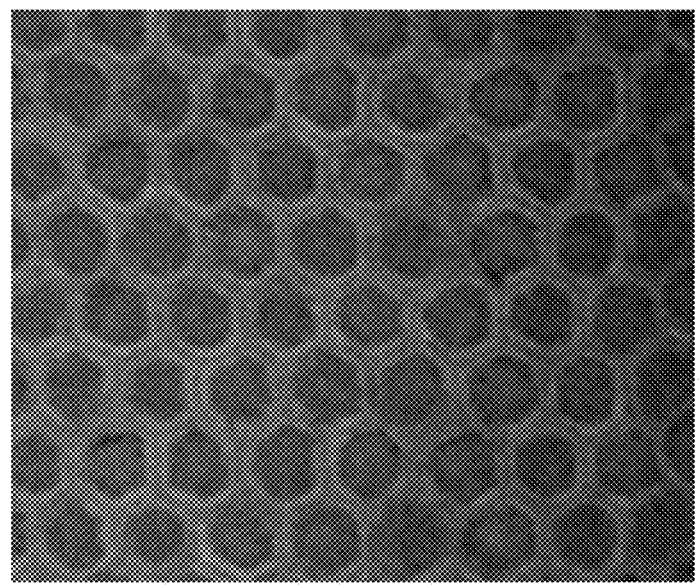
FIG. 6 is a topographical optical image of a structure, according to some embodiments.

FIG. 6 is a topographical optical image of a structure, according to some embodiments. FIG. 6 shows an optical picture (taken with an optical microscope) of an exemplary structure comprising microstructure units, e.g., microstructure units in the shape of honeycombs. The picture is taken of a top view of a structure, such as the structure described above in connection with FIG. 5.

Figure 7:
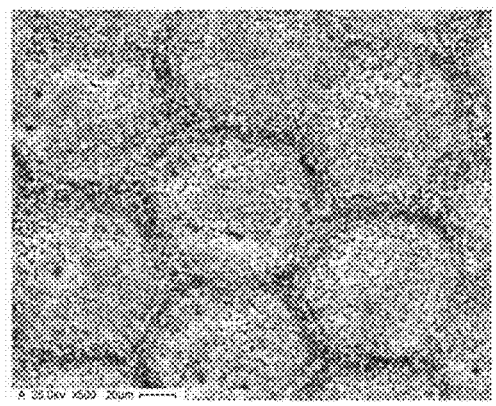
FIG. 7 is a topographical scanning electron micrograph image of a structure, according to some embodiments.

FIG. 7 is a topographical scanning electron micrograph image of a structure, according to some embodiments. The structure shown in FIG. 7 is a structure coated on a lithium ion cathode containing multiple microstructure units with a non-uniform distribution of active and binding materials. In each of the microstructure units, the active material and the binding material self-segregated, forming a non-uniform distribution where the binding material aggregated along the edges of the units. As shown in FIG. 7, in the microstructure units, there is about 40% more binding material at the edges of the units than in the center of the units.

The structure in FIG. 7 may be manufactured with the composition comprising the components in Table 1 below and the structure may comprise $LiFePO_4$ (the active material), Triton-X100, carbon black, and PVdF Solef 5130 (the binding material).

In some examples, the flowable liquid may comprise the components in Table 1 below.

TABLE 1

| Components | % wt | Target Weight (g) (~60 mL) |
|---|---|---|
| LiFePO$_4$ (active material) | 3 | 1.94 |
| N-Methyl-2-pyrrolidone (NMP) | 95.66 | 61.8 |
| Triton-X100 | 1 | 0.65 |
| Carbon Black (CB) | 0.17 | 0.11 |
| PVdF Solef 5130 (binding material) | 0.17 | 0.11 |

Figure 8A:
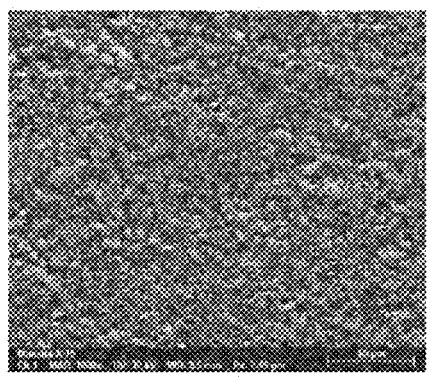
FIG. 8A is a topographical scanning electron micrograph image of a prior art commercial electrode.
Figure 8B:
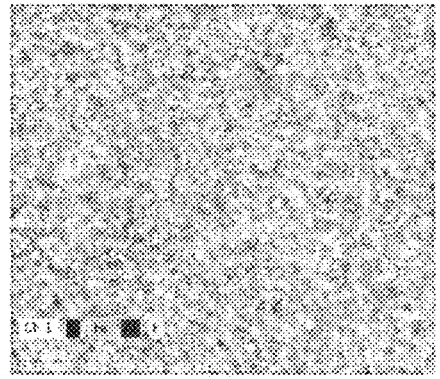
FIG. 8B illustrates an energy dispersive spectroscopy of the prior art commercial electrode shown in FIG. 8A.

For comparison, FIGS. 8A and 8B are pictures of material distributions in commercial electrodes made with prior art techniques, such as blade casting, die casting, tape casting, or slot-die coating technology. FIG. 8A is a topographical scanning electron micrograph image of the commercial electrode. FIG. 8B illustrates the energy dispersive spectroscopy of the commercial electrode captured using a scanning electron microscope (SEM). As illustrated in FIGS. 8A-8B, there is a homogeneous uniform distribution of binding and active materials, which is different from the non-uniform distribution of the materials in the structure according to the present disclosure, e.g., the structure shown in FIG. 7.

Figure 9A:
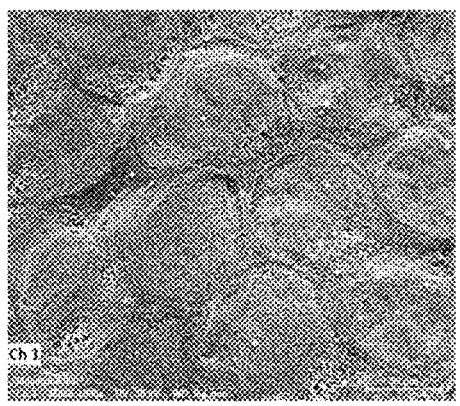
FIG. 9A is a topographical scanning electron micrograph image of a structure, according to some embodiments.
Figure 9B:
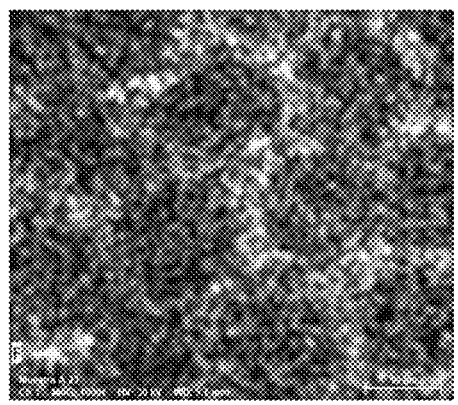
FIG. 9B illustrates the fluorine channel of an energy dispersive spectroscopy of the structure shown in FIG. 9A, according to some embodiments.

FIG. 9A is a topographical scanning electron micrograph image of a structure, according to some embodiments. FIG. 9B illustrates the fluorine channel of an energy dispersive spectroscopy of the structure shown in FIG. 9A, according to some embodiments. Fluorine is only present in the PVDF binding material used in this sample. FIGS. 9A and 9B show another example of the structure with the binding material accumulated at the edges of the microstructure units. FIGS. 9A and 9B illustrate the top layer of an electrode microstructure.

Figure 10A:
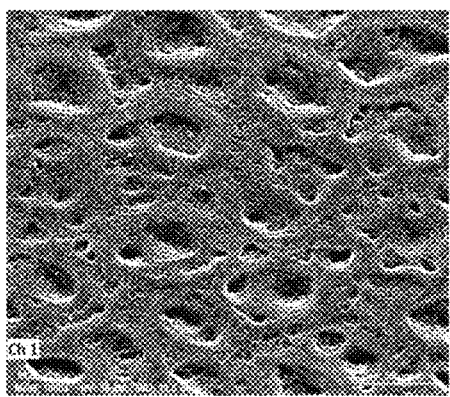
FIG. 10A illustrates a topographical scanning electron micrograph image of a structure, according to some embodiments.
Figure 10B:
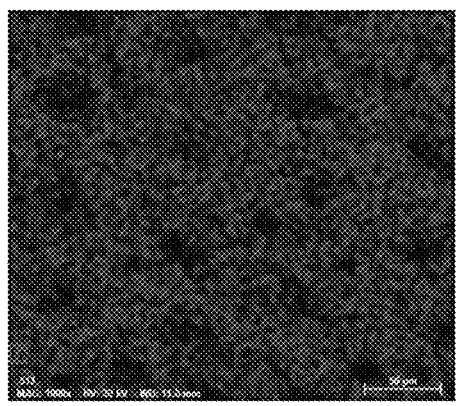
FIG. 10B illustrates an energy dispersive spectroscopy of the structure shown in FIG. 10A, according to some embodiments.

FIG. 10A illustrates a topographical scanning electron micrograph image of a structure, according to some embodiments. FIG. 10B illustrates an energy dispersive spectroscopy of the structure shown in FIG. 10A, according to some embodiments. FIGS. 10A and 10B show yet another example of the structure with the binding material accumulated at the edges of the microstructure units. In this structure, the active material also accumulates at the edges but within the boundaries formed by the binding material, e.g., the microstructure units are "hollow" (referring to a higher material density at the edge than the center of a microstructure unit). The lighter gray areas in FIG. 10B illustrate the ionic properties of the active material.

Figure 11:
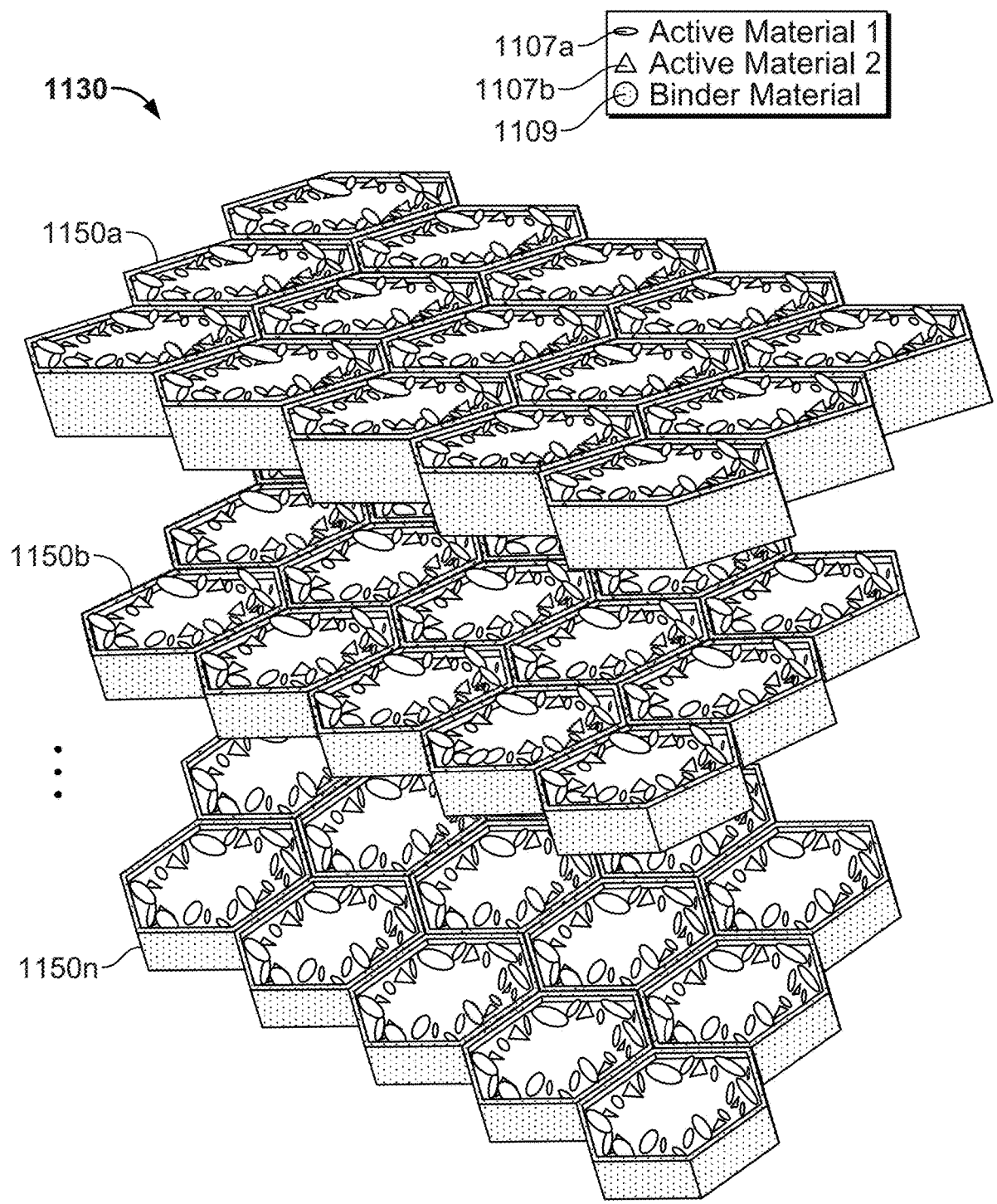
FIG. 11 is a schematic representation of the structure shown in FIGS. 10A-10B.

FIG. 11 shows a schematic of the "hollow" structure in FIGS. 10A and 10B. In some examples, the structure 1130 may comprise a conductive material that also distributes along the edges of the units but within the boundaries formed by the binding material. In some examples, the "hollow" structure may have multiple layers 1150a-n of microstructure units as shown in FIG. 11. The microstructure units of FIG. 11 include a first active material 1107a, a second active material 1107b, and a binder material 1109.

Figure 12:
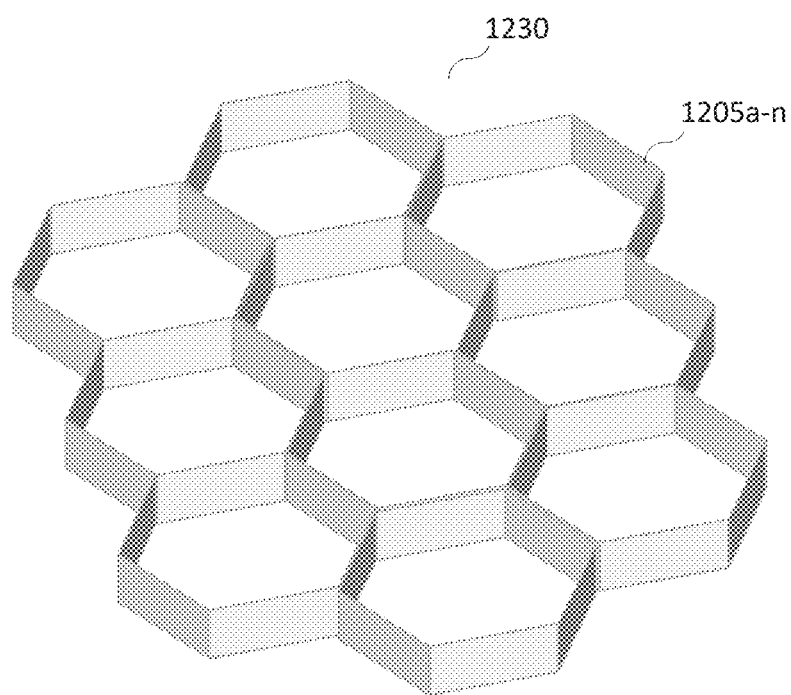
FIG. 12 illustrates a structure with the binding material but not the active material, according to some embodiments.

FIG. 12 shows a schematic of another example of the structures according to the present disclosure. The structure 1230 may comprise a binding material but not active material. The binding material may accumulate at the edges of the microstructure units. The structure 1230 may comprise one or more layers, e.g., a plurality of layers 1205a-n.

The distribution of the active material (e.g., within or at the edges of the microstructure units) may be controlled by the manufacturing process. In some embodiments, the distribution of the active material may be controlled with different drying processes. For example, different infrared (IR) protocols may be used. FIG. 13 shows that different distributions of the active material in the microstructure units resulted from different infrared exposures. In the drying process, with a lower IR exposure, the active material accumulated at the edges of the resulting microstructure units (e.g., forming "hollow" units), while with a lower IR infrared exposure the active material accumulated within the edges of the resulting microstructure units (e.g., forming "filled" units).

Figure 14:
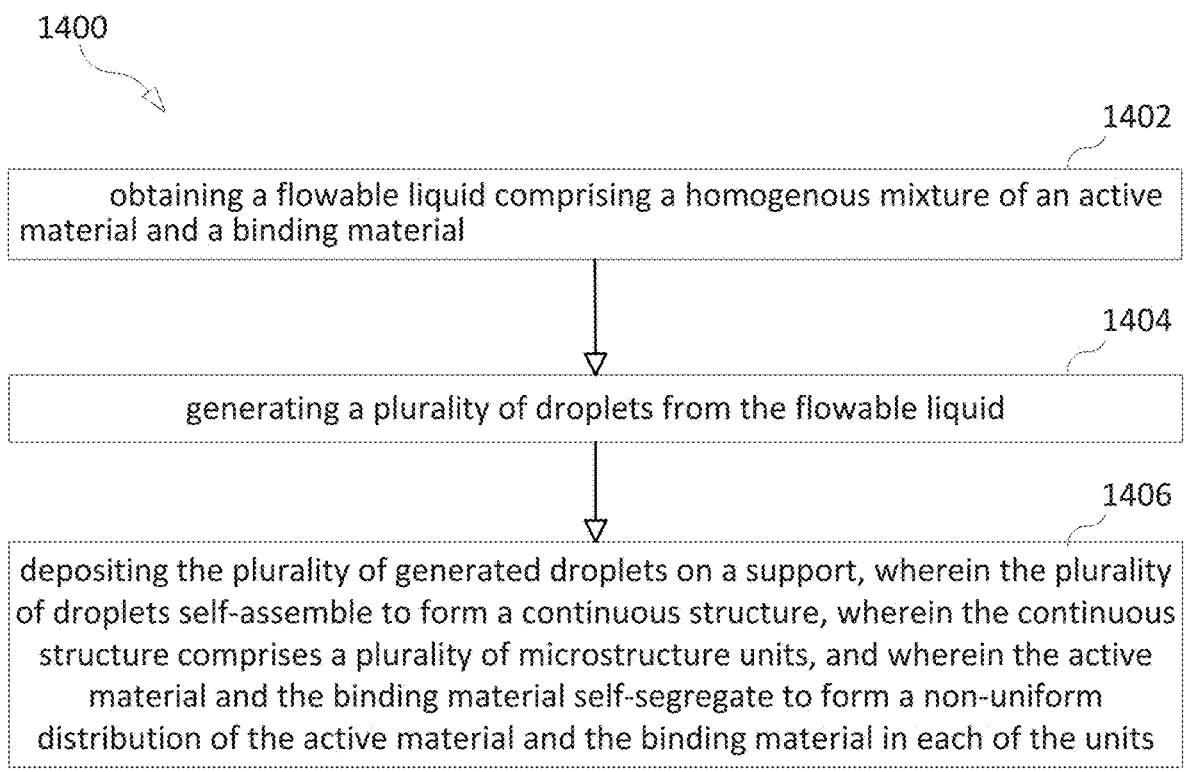
FIG. 14 is a method of manufacturing a structure, according to some embodiments.

FIG. 14 shows a flowchart of a method 1400 of manufacturing a structure, according to some embodiments. The method 1400 comprises Steps 1402, 1404, and 1406. Step 1402 comprises obtaining a flowable liquid comprising a homogenous mixture of an active material and a binding material. Step 1404 comprises generating a plurality of droplets from the flowable liquid. Step 1406 comprises depositing the plurality of generated droplets on a support. In some embodiments, the continuous structure may comprise a plurality of microstructure units, and the active material and the binding material self-segregate to form a non-uniform distribution of the active material and the binding material in each of the units.

Figure 15:
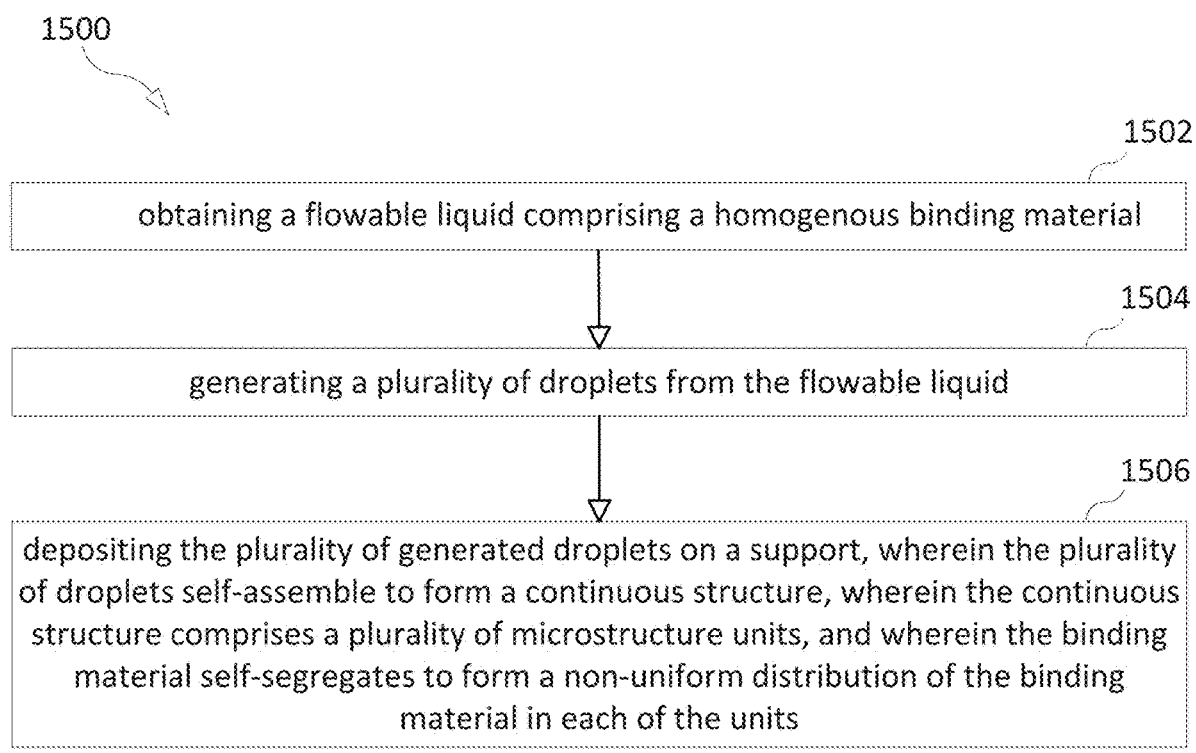
FIG. 15 is a method of manufacturing a structure, according to some embodiments

FIG. 15 shows a flowchart of a method 1500 of manufacturing a structure, according to some embodiments. The method 1400 comprises Steps 1502, 1504, and 1506. Step 1502 comprises obtaining a flowable liquid comprising a homogenous binding material. Step 1504 comprises generating a plurality of droplets from the flowable liquid. Step 1506 comprises depositing the plurality of generated droplets on a support. In some embodiments, the plurality of droplets may self-assemble to form a continuous structure, wherein the continuous structure comprises a plurality of microstructure units, and wherein the binding material self-segregates to form a non-uniform distribution of the binding material in each of the units.

In another aspect, the present disclosure provides an article comprising the structure described herein. In some examples, the article may comprise a support coated with the structure. Such support may comprise a metallic film, a metallized plastic film, metallized polymer film, glass film, ceramic film, polymer film, or paper. In one example, the support may be a metallic film. In another example, the support may be a metallized film. In another example, the support may be a plastic film. In another example, the support may be a glass film. In another example, the support may be a ceramic film. In another example, the support may be a polymer film. In another example, the support may be paper. In some examples, the article may comprise a component filled with a material with the structure described herein.

In some embodiments, the article may be an electrochemical cell. The electrochemical cell may comprise one or more electrodes comprising (e.g., coated with) the structure. In some examples, the electrode may comprise the structure with microstructure units, each of which is bounded by 6 sides, e.g., in a honeycomb shape. The electrode may comprise multiple layers of the structure. In some examples, at least two of the layers may be offset.

In some embodiments, the structure may be used to coat electrodes to improve the performance of batteries. In some examples, an inkjet-printed coffee-stain liquid droplet effect may be used to control the placement of the active material and the binding material on a substrate, thereby allowing precision control of the electrode microstructure. In some examples, the structure coating the electrode may have a microstructure in the form of a honeycomb, e.g., with the binding material forming a honeycomb shape and the area within the honeycomb units filled with the active material. Such a structure may be layered in various ways to optimize electrochemical cell performance for different applications. In some examples, the electrode may comprise a single or a plurality of layers of printed honeycomb structures.

The microstructure units in the structure on the electrode may have certain physical properties such as material densities, porosities, and binding material placement. In some embodiments, such properties may enhance the mass transport of ions (e.g., lithium ions) through the electrode, which may result in a higher power density when compared to electrodes using the same material but without the microstructure units. In some embodiments, the structure may comprise a secondary pore network. Such a network may be capable of modifying ion transport within the microstructure, e.g., increasing the ion diffusion (e.g., lithium ion diffusion) through the electrode.

In some embodiments, the structure with the microstructure units may be stronger than the amorphous structure, leading to stronger battery electrodes with reduced or no electrode cracking. Since electrode cracking is one of the most important issues affecting battery life, the electrode with the structure described herein may have longer battery cycle life, when compared to electrodes with the same material but without the microstructure features.

In some embodiments, more than one component of the electrochemical cell may comprise the structure described herein. For example, cathode(s), anode(s), separator(s), solid or semi-solid electrolyte(s), other battery chemistries or electrical device(s), or any combination thereof, may comprise the structure (e.g., coated by the structure) for desired functions. For example, cathode(s), anode(s), separator(s), solid or semi-solid electrolyte(s), other battery chemistries or electrical device(s), or any combination thereof, may comprise the structure may be used as the support when making the structure.

As used herein, the singular forms "a," "an," and "the" include both singular and plural referents unless the context clearly dictates otherwise.

The term "optional" or "optionally" means that the subsequent described event, circumstance or substituent may or may not occur, and that the description includes instances where the event or circumstance occurs and instances where it does not.

The recitation of numerical ranges by endpoints includes all numbers and fractions subsumed within the respective ranges, as well as the recited endpoints.

The term "about" in relation to a reference numerical value and its grammatical equivalents as used herein can include the numerical value itself and a range of values plus or minus 10% from that numerical value. For example, the amount "about 10" includes 10 and any amount from 9 to 11.

The term "substantially the same" or "essentially the same" refers to a sufficiently high degree of similarity between two or more numeric values, compositions or characteristics that one of skill in the art would consider the difference between these values, compositions or characteristics to be of little or no statistical significance within the context of the property being measured. The difference between two substantially the same numeric values may, for example, be less than 10%.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment," "an embodiment," "an example embodiment," means that a particular feature, structure or characteristic described in connection with the embodiment is included in at least one embodiment of the present invention. Thus, appearances of the phrases "in one embodiment," "in an embodiment," or "an example embodiment" in various places throughout this specification are not necessarily all referring to the same embodiment, but may. Furthermore, the particular features, structures, or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention. For example, in the appended claims, any of the claimed embodiments can be used in any combination.

All publications, published patent documents, and patent applications cited herein are hereby incorporated by reference to the same extent as though each individual publication, published patent document, or patent application was specifically and individually indicated as being incorporated by reference.

Various modifications and variations of the described methods, compositions, and kits of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

What is claimed is:

1. A method of manufacturing a structure, the method comprising:
   obtaining a flowable liquid comprising a homogenous mixture of an active material and a binding material;
   generating a plurality of droplets from the flowable liquid; and
   depositing the plurality of generated droplets on a support, wherein the plurality of droplets self-assemble to form a continuous structure, wherein the continuous structure comprises a plurality of microstructure units, and wherein the active material and the binding material self-segregate to form a non-uniform distribution of the active material and the binding material in each of the units.

2. The method of claim 1,
   wherein the active material imparts a physical, thermal, chemical, catalytic, electrical, magnetic, radioactive, photonic, biological, or combinations thereof property to the continuous structure, and when the active material imparts an electrical property to the continuous structure, the electrical property comprises an electron conductor, ion conductor, semiconductor, electrical insulator, or a combination thereof.

3. The method of claim 1, wherein the active material distributes non-uniformly within an area in each microstructure unit bounded by the respective unit.

4. The method of claim 1, wherein the binding material is an organic material, inorganic material, or combinations thereof or wherein the binding material comprises a liquid carrier comprising an inorganic composition or organic composition.

5. The method of claim 1, wherein the non-uniform distribution of the active material and the binding material in each of the units comprises one or more of:
the binding material self-segregates to accumulate at edges of the units,
the binding material accumulates adjacent to a boundary formed by the binding material,
a center of a respective unit is hollow and contains no active material or binding material,
or
the active material self-segregates to accumulate at edges of the units.

6. The method of claim 1, further comprising polymerizing the binding material, wherein the polymerizing is performed by heat, catalyst, or irradiation, or a combination thereof.

7. The method of claim 1, wherein the flowable liquid further comprises a material configured to change a surface charge or zeta potential of at least one of the active material or the binding material, wherein the material comprises a coupling agent, a silane, a surfactant, a dispersant, or a combination thereof.

8. The method of claim 1, wherein
the generated droplets have an average volume in the range of 0.1 picoliters to 3000 picoliters,
the units have an average diameter from 0.04 micrometers to 2000 micrometers, or
the flowable liquid has a viscosity from 3 centipoise to 1500 centipoise.

9. The method of claim 1, wherein the support comprises a metallic film, metallized plastic film, metallized polymer film, glass film, ceramic film, polymer film, or paper.

10. The method of claim 1, further comprising:
controlling at least one of a volume, size, or position of the droplets by a digitally controlled tool.

11. The method of claim 1, wherein the continuous structure comprises a layer or a plurality of stacked layers, wherein each layer comprises a plurality of the units along a planar surface of the support.

12. The method of claim 11, wherein the continuous structure comprises a plurality of stacked layers and an average diameter of the units in a first layer of the plurality of stacked layers is different than an average diameter of the microstructure units in a second layer of the plurality of stacked layers.

13. The method of claim 11, wherein the continuous structure comprises a plurality of stacked layers and a first layer of the plurality of stacked layers comprises one or more of:
a material that is different than one or more materials in a second layer of the plurality of stacked layers, or
an active material that is the same as an active material in the second layer of the plurality of stacked layers, wherein the active material in the first layer has a different physical, chemical, catalytic, electrical, magnetic, radioactive, photonic, biological, or combinations thereof characteristic than the same active material in the second layer of the plurality of stacked layers.

14. The method of claim 1, wherein each microstructure unit comprises an area bounded by at least three sides, and wherein one or more of the plurality of microstructure units comprise an area bounded by six sides to form a honeycomb cell.

15. The method of claim 1, wherein the active material is a compound comprising lithium, and wherein the active material intercalates lithium ions or has a conversion reaction in the presence of lithium ions.

16. The method of claim 1, wherein the support is comprised in a cathode, anode, separator, solid electrolyte, or semi-solid electrolyte.

17. The method of claim 1, wherein the active material comprises one or more of:
an active catalyst capable of causing or accelerating a chemical reaction between reactants and wherein the reactants and a product of the chemical reaction are transported through the microstructure units,
an active adsorbent capable of selectively binding to an adsorbate and wherein a medium carrying the adsorbate is transported through the microstructure units,
an active adsorbent capable of giving a response when binding to an adsorbate and wherein the response comprises a change in at least one of a physical, chemical, electrical, optical or magnetic property of the active adsorbent,
an active carrier of a compound and wherein at least a part of the compound can be released in a controlled manner when contacted with a transport medium and wherein the transport medium is transported through the microstructure units,
an active carrier of a photo-sensitive compound and wherein the photo-sensitive compound gives an optical response when excited photonically
an active carrier of a magnetic-sensitive compound and wherein the magnetic-sensitive compound gives a magnetic response when excited magnetically, or
an active carrier of a pigment and wherein the pigment gives an optical response when excited with visible, ultraviolet or infrared light.

* * * * *